R. D. WIRT.
HOSE REEL.
APPLICATION FILED NOV. 7, 1916.
1,244,818.
Patented Oct. 30, 1917.
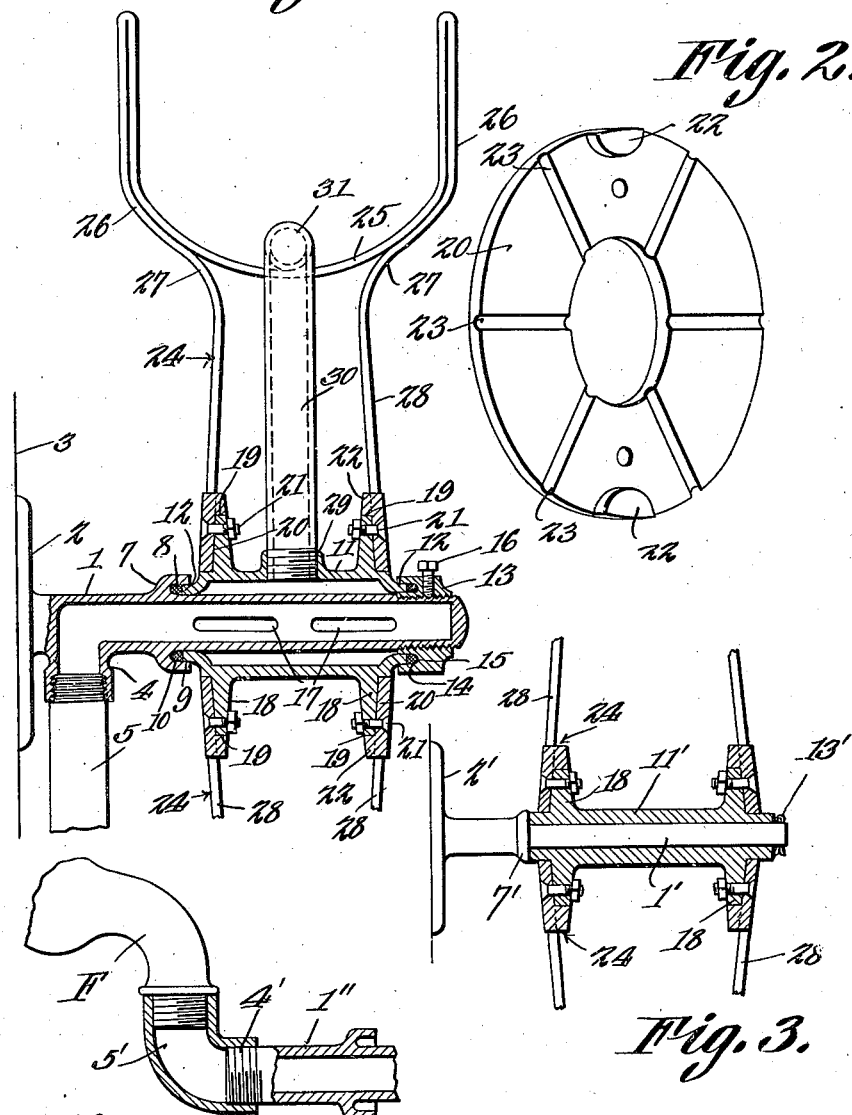
R. D. Wirt
Inventor,
by C. A. Snow & Co.
Attorneys.
Witnesses

UNITED STATES PATENT OFFICE.

REUBEN D. WIRT, OF PHILADELPHIA, PENNSYLVANIA.

HOSE-REEL.

1,244,818.

Specification of Letters Patent.

Patented Oct. 30, 1917.

Original application filed August 7, 1915, Serial No. 44,204. Divided and this application filed November 7, 1916. Serial No. 130,026.

*To all whom it may concern:*

Be it known that I, REUBEN D. WIRT, a citizen of the United States, residing at Philadelphia, in the county of Philadelphia and State of Pennsylvania, have invented a new and useful Hose-Reel, of which the following is a specification.

The present invention appertains to hose reels, and aims to provide a hose reel of novel and improved construction, this being a division of the application for patent on hose reel filed August 7, 1915, Serial No. 44,204.

It is the object of the invention to provide a hose reel of simple, light and inexpensive construction, which can be knocked down readily in order that it can be stored or packed within small compass, enabling the device to be transported by parcel post or otherwise at a minimum expense, the device being readily assembled or set up, and being thoroughly efficient, practical and serviceable in use.

A further object of the invention is the provision of a reel embodying a unique assemblage of the component parts whereby the elements coöperate in a desirable and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a fragmental view of the reel.

Fig. 2 is an enlarged perspective view of one of the rings or annular plates.

Fig. 3 is a fragmental view illustrating a modification.

Fig. 4 is a sectional detail illustrating another modification.

In carrying out the invention, reference being had particularly to Figs. 1 and 2, there is provided a hollow spindle 1, the ends of which are exposed, and which is provided at one end with a base or flange 2 adapted to be secured in any suitable means to a wall or other support 3 for holding the spindle 1 firmly in place. The spindle 1 is provided adjacent the base 2 with an angularly extending inlet arm 4 to which one end of a short hose 5 is connected, the other end of the hose 5 being connected to a faucet, hydrant or other source of water, whereby the water is delivered into the spindle 1.

The spindle 1 is provided between its ends and adjacent the arm 4 with an annular peripheral collar 7 provided with an annular flange or apron 8 projecting toward the free end of the spindle and providing an annular stuffing box 9 between the flange 8 and the spindle 1 receiving the packing 10.

The reel proper embodies a hub or sleeve 11 of greater diameter than the spindle 1 and of shorter length than the said spindle, the hub 11 surrounding the spindle 1 and having contracted or reduced ends 12 journaled upon the spindle, one end 12 being received by the stuffing box 9 and bearing against the packing 10 to prevent leakage at the respective end of the hub.

A retaining nut 13 is threaded upon the free end portion of the spindle 1 for retaining the hub 11 in position upon the spindle, and the nut 13 has an annular stuffing box 14 at its inner side rotatably receiving the respective contracted end 12 of the hub 11. A packing 15 is disposed within the annular stuffing box 14 and bears against the respective end of the hub. The nut 13 is held in place by means of a set screw 16 carried thereby and bearing against the spindle 1. When the nut 13 is screwed tight upon the spindle 1, the hub 11 is held in place between the collar 7 and nut 13, and the packings 10 and 15 are brought under compression to prevent leakage at the ends of the hub, it being noted also that the nut 13 provides a stuffing box for the respective end of the hub.

The intermediate or body portion of the hub 11 provides an annular chamber surrounding the spindle 1, and the water is delivered from the spindle 1 into the hub 11 through one or more slots or openings 17 with which the spindle 1 is provided within the hub 11.

The hub 11 is provided adjacent but spaced from its reduced ends 12 with outstanding annular flanges 18, each of which has diametrically opposite notches 19 in its periphery. A pair of slightly dished rings or annular side plates 20 are slipped snugly upon the hub 11 adjacent the ends 12 thereof and rest against the outer slightly conical sides of the flanges 18, and the plates 20 are detachably secured to the flanges 18 by means of bolts or other removable securing elements 21 engaged through suitable apertures in the plates and flanges. Each of the plates 20 is provided with diametrically opposite lugs 22 projecting from its inner side adjacent the periphery or margin thereof and fitting in the recesses 19 of the respective flange 18, whereby the lugs 22 relieve the bolts or securing elements 21 of the strains which would be liable to shear or break them.

Each of the plates 20 is provided at its inner side with a plurality of radial grooves 23 for the reception of the terminals of the reel arms 24. These arms, of which there may be any suitable number, are fashioned from rods, bars or other suitable stock. Each arm 24 embodies a U-shaped member 25, and portions 26 reflexed or bent back outwardly against the remote sides of the limbs or arms of the member 25. From the portions 26, the stock is bent or cut or curved along converging lines, as at 27, the portions 27 bearing or resting against the outer sides of the intermediate or yoke portion of the member 25. The portions 27 are spaced apart, and the stock has the spoke portions 28 projecting on slightly divergent lines from the portions 27 in a direction opposite to the direction in which the limbs of the member 25 project. The terminals of the stock or the spoke portions 28 thereof are received by the respective grooves 23 of the plates 20. The arms 24 are readily assembled with the plates 20 before said plates are clamped to the flanges 18, and then when the bolts 21 are applied and tightened, the terminals of the spoke portions 28 are clamped tightly between the plates 20 and flanges 18, thus preventing the accidental detachment of the arms 24. The U-shaped members 25 as well as the remaining portions of the arms 24 are disposed in radial planes in which the axis of the spindle 1 and hub 11 lie, the portions of each arm 24 lying in a common plane. The members 25 provide means for receiving the hose, whereby the hose may be wound upon the members 25 of the arms 24, as will be apparent.

In order to deliver the water from the hub 11 to the hose (not shown) wound upon the reel, the hub 11 has an outlet 29 between its ends, and a radial pipe 30 has its inner end attached to the outlet 29 of the hub 11 and is provided at its outer end with an elbow 31 adjacent one of the members 25 for the attachment of the respective end of the hose to the pipe 30. The pipe 30 may be separate from the hub 11 as illustrated or may be integral therewith, whichever is preferred.

The reel may be used for carrying garden hose, or may be used for carrying any hose used for any purpose, it being evident that the reel may be constructed in various sizes and proportions.

When the hose wound upon the reel 1 is connected to the pipe 30, and when the hose 5 is attached to a faucet, hydrant, pipe, or other source of water, the water may flow from the hose 5 into the hose (not shown) wound upon the reel, at any position of the reel, and without the necessity of taking the hose from the reel. The water can flow from the hose 5 into the spindle 1, thence through the openings 17 into the hub 11, and thence through the pipe 30 into the hose carried by the reel. The packings 10 and 15 prevent the leakage of water from the ends of the hub.

The reel may be knocked down, for purpose of compact storage or shipment, this being readily accomplished by slightly loosening the bolts 21, which allows the arms 24 to be withdrawn from the plates 20. The arms 24 may then be placed one upon the other, and packed within a small box with the spindle 1 and hub 11.

Fig. 3 illustrates a modification wherein the passage of water through the spindle and hub is eliminated. The spindle 1' in the modified form is provided at one end with a base plate or flange 2' for attaching it to a support, and the spindle 1' has a collar 7' against which one end of the hub 11' rests. A cotter pin or other retaining element 13' is engaged with the free end of the spindle 1' for holding the hub 11', thereon. The hub 11' has the flanges 18 for the attachment of the reel arms 24, the same as above described.

Fig. 4 illustrates how the spindle 1" can be attached directly to a faucet F or a hydrant, pipe or equivalent source of water. In this case, the end of the spindle 1" is open, and is threaded, as at 4', into an elbow or coupling 5' which is attached to the faucet or water supply member F. The reel can thus be supported from the faucet, valve or the like.

Having thus described the invention, what is claimed as new is:—

A reel comprising a hub having spaced outstanding flanges, the opposite sides of which are conical, radial arms having spoke portions and U-shaped receiving members between the outer ends of said portions and contacting therewith to limit the movement of said portions toward one another, the inner ends of said portions seating against said conical sides of the flanges, dished rings fitted on the hub at the opposite sides of said flanges and having radial grooves receiving said spoke portions, said flanges and rings having interengaging lugs and notches, and securing elements extending through said flanges and rings.

In testimony that I claim the foregoing as my own, I have hereto affixed my signature in the presence of two witnesses.

REUBEN D. WIRT.

Witnesses:
 MONROE E. MILLER,
 AGNES ROCKELLI.